US010316867B2

(12) United States Patent
Carl et al.

(10) Patent No.: US 10,316,867 B2
(45) Date of Patent: Jun. 11, 2019

(54) HYDRAULIC ROTARY ACTUATOR WITH BUILT-IN MECHANICAL POSITION FEEDBACK

(71) Applicant: Parker-Hannifin Corporation, Cleveland, OH (US)

(72) Inventors: Blake Adam Carl, University Heights, OH (US); James William Howland, Mayfield Heights, OH (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 148 days.

(21) Appl. No.: 15/454,224

(22) Filed: Mar. 9, 2017

(65) Prior Publication Data

US 2018/0258963 A1    Sep. 13, 2018

(51) Int. Cl.
*F15B 15/12* (2006.01)
*F16H 39/04* (2006.01)
*F16K 31/04* (2006.01)
*F16K 11/16* (2006.01)
*F15B 9/09* (2006.01)
*F15B 9/12* (2006.01)
*F15B 9/14* (2006.01)
*F15B 15/20* (2006.01)
*F04B 17/05* (2006.01)
*F04B 49/00* (2006.01)

(52) U.S. Cl.
CPC .............. *F15B 15/12* (2013.01); *F04B 17/05* (2013.01); *F15B 9/09* (2013.01); *F15B 9/12* (2013.01); *F15B 9/14* (2013.01); *F15B 15/202* (2013.01); *F16H 39/04* (2013.01); *F16K 11/163* (2013.01); *F16K 31/041* (2013.01); *F04B 49/002* (2013.01)

(58) Field of Classification Search
CPC ................................ F15B 15/12; F16H 39/04
See application file for complete search history.

(56) References Cited

U.S. PATENT DOCUMENTS

| 3,418,886 A | * | 12/1968 | Brundage | ............... F15B 15/12 464/37 |
| 4,328,831 A | * | 5/1982 | Wolff | ..................... B65G 53/30 137/625.31 |
| 6,289,787 B1 | * | 9/2001 | Underwood | ............ F15B 15/12 92/121 |
| 8,726,787 B2 | * | 5/2014 | Glynn | ..................... F15B 15/12 92/121 |

* cited by examiner

*Primary Examiner* — Thomas E Lazo
(74) *Attorney, Agent, or Firm* — Renner, Otto, Boisselle & Sklar, LLP

(57) ABSTRACT

A rotary actuator includes a central housing; an output shaft that extends through the central housing; a vane that is mechanically coupled to the output shaft and divides the central housing into a first chamber and a second chamber; and a flow control mechanism that is moveable within the central housing and including a high pressure port and a low pressure port for communicating hydraulic fluid into and from the first and second chambers. The flow control mechanism is moveable to position the high pressure port and low pressure port relative to the first chamber and the second chamber for communication of the hydraulic fluid, thereby generating a pressure differential across the chambers. The vane rotates within the central housing in response to the pressure differential, and rotation of the vane drives the output shaft. A motor is configured to receive control signals to drive the movement of the flow control mechanism.

18 Claims, 12 Drawing Sheets

HYDRAULIC ROTARY ACTUATOR WITH BUILT-IN MECHANICAL POSITION FEEDBACK

FIELD OF INVENTION

The present invention relates generally to actuators employed in hydraulic drive systems, and to hydraulic rotary actuators in particular.

BACKGROUND

A prime mover, such as an internal combustion engine or the like, can be connected to a hydrostatic transmission to drive a wheel in a light vehicle. A hydrostatic transmission is particularly suitable to provide traction drive for light vehicles such as turf machines, lawn tractors, ride-on lawn mowers, and like devices. A hydrostatic transmission may be connected to a variety of gearboxes and transaxles, so the same components can be utilized on a wide variety of light vehicle models. A simple usage of hydrostatic transmissions is on zero-turn radius vehicles, including zero-turn radius mowers and tractors.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and cost of such mowers decrease. As the size of such mowers decreases, however, the space available for the hydraulic components and/or the prime mover also decreases.

Generally, a hydrostatic transmission includes a variable displacement hydraulic pump connected in a closed hydraulic circuit with a fixed or variable displacement hydraulic motor. The hydraulic pump may be a piston-type pump including a plurality of reciprocating pistons, which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor, which allows the transmission output speed to be varied and controlled. The rotation of the hydraulic motor may be used to drive an output shaft, which in turn ultimately drives a wheel axle of a light vehicle of the types described above.

Hydraulic rotary actuators are used in a variety of applications in various industries. One use of a hydraulic rotary actuator is to control the rotational position of the swash plate associated with a hydraulic pump in a vehicle transmission of the type described above. Rotary actuators typically may include two chambers separated by a vane. By pressurizing the chamber on either size of the vane, the vane will rotate in the appropriate direction. For example, to rotate a vane clockwise, a chamber on a counterclockwise side of the vane is connected to a high pressure hydraulic fluid source, and a chamber on a clockwise side of the vane is connected to a low pressure source (or atmosphere). This pressure differential provides a force on the vane to rotate the vane in the clockwise direction. The vane assembly may be connected to an output drive shaft through which the rotational torque is transferred to an external device, such as for example the swash plate associated with a hydraulic pump as referenced above. Rotation in the counterclockwise direction is the same as the clockwise direction, except the clockwise side chamber is connected to high pressure and the counterclockwise side chamber is connected to low pressure (or atmosphere).

Precise control of the vane position, however, has proven to be a complex and difficult process. In conventional rotary actuators, control may be performed by precise electronic control of the fluid flow on the high pressure and low pressure sides. This often is achieved through complex and expensive electronic fluid control. Because of the difficulty of precise control, conventional rotary actuators have not been utilized to their maximum effectiveness, particularly in hydrostatic transmissions for zero-turn radius vehicles in which size and simplicity of design are of a particular concern.

SUMMARY OF INVENTION

The present invention provides a rotary actuator that improves over the deficiencies of conventional configurations. The rotary actuator of the present invention operates using built-in mechanical feedback that provides for precise positioning of the actuator vane, without the need for the complex electronic control systems typical of conventional configurations.

The rotary actuator may include a flow control mechanism configured to port high pressure and low pressure to opposite sides of the actuator vane, thereby creating a pressure differential across the vane. In exemplary embodiments, the flow control mechanism is a valve plate that has a high pressure port and a low pressure port. The valve plate is rotatable about an output shaft that is connected to a vane that extends through the output shaft. The vane separates an interior of the actuator into first and second chambers on opposite sides of the vane. Based on the position of the valve plate, the high pressure port may be in fluid communication with either of the first or second chambers to render such chamber the high pressure side. The low high pressure port in turn is in fluid communication with the other of the first or second chambers to render such chamber the low pressure side. The vane will rotate under the pressure differential to a location at which the vane closes off the high and low pressure ports of the valve plate. At such position, the pressure differential as between the first and second chambers equalizes, and the vane remains stationary at such point.

The vane position, via the vane's connection with the output shaft, determines the rotational position of the output shaft. The rotational position of the output shaft in turn drives and determines the position of any device that is driven by the output shaft. In exemplary embodiments, the output shaft may drive the rotational position of a swash plate associated with a hydraulic pump in a hydrostatic transmission. The position of the valve plate may be moved and set by an electric motor to which external electronic control signals are supplied.

With such configuration, the vane rotational position is maintained where the vane closes off the high pressure and low pressure ports of the valve plate, thereby equalizing the pressure differential in the first versus the second chambers on opposite sides of the vane. In this manner, a precise positioning of the vane is achieved and maintained by a built-in mechanical feedback of the vane position relative to the positions of the high and low pressure ports. The rotary actuator, therefore, has a compact and simplified configuration that controls vane position with the built-in mechanical feedback, obviating the need for a complex control system as is typical of conventional configurations.

An aspect of the invention, therefore, is a rotary actuator having an enhanced feedback control mechanism. In exemplary embodiments, the rotary actuator includes a central housing; an output shaft that extends through the central housing; a vane that is mechanically coupled to the output shaft and divides the central housing into a first chamber and a second chamber; and a flow control mechanism that is moveable within the central housing and configured to port high pressure to one side of the vane and low pressure to an opposite side of the vane, thereby generating a pressure differential across the chambers. In exemplary embodiments, the flow control mechanism is a valve plate that is moveable within the central housing and including a high pressure port and a low pressure port for communicating a working fluid (e.g., hydraulic fluid) into and from the first and second chambers. The valve plate is moveable to position the high pressure port and low pressure port relative to the first chamber and the second chamber for communication of the working fluid, thereby generating the pressure differential across the chambers. The vane rotates within the central housing in response to the pressure differential, and rotation of the vane drives the output shaft.

Another aspect of the invention is an actuator assembly that incorporates the rotary actuator for controlling a hydraulic pump. In exemplary usage may be a hydrostatic transmission that incorporates the rotary actuator. In exemplary embodiments, the hydrostatic transmission includes a hydraulic pump, a hydraulic motor, wherein the hydraulic pump pumps hydraulic fluid to the motor, and the rotary actuator. The rotary actuator is controlled to drive the hydraulic pump to control the flow of hydraulic fluid from the hydraulic pump to the hydraulic motor.

Another aspect of the invention is a method of controlling a rotary actuator to drive an output shaft. In exemplary embodiments, the control method may include the steps of providing the rotary actuator, and moving the flow control mechanism to 25 port the high pressure and low pressure relative to the first chamber and the second chamber for communication of the working fluid, thereby generating a pressure differential across the chambers. In embodiments in which the flow control mechanism is a valve plate, the control method may include moving the valve plate to position the high pressure port and low pressure port relative to the first chamber and the second chamber for communication of the working fluid, thereby generating the pressure differential across the chambers. The vane rotates within the central housing in response to the pressure differential, and rotation of the vane drives the output shaft.

The control method may include moving the flow control mechanism in a first direction (e.g., clockwise) between a first position and a second position different from the first position. In the first position, the vane blocks off the high pressure port and the low pressure port to block the flow of the working fluid between the flow control mechanism and the first and second chambers. When the flow control mechanism is moved to the second position, the high pressure port is positioned to be in fluid communication with the first chamber to permit the flow of the working fluid into the first chamber, and the low pressure port is positioned to be in fluid communication with the second chamber to permit the flow of the working fluid from the second chamber, thereby creating a pressure differential from the first chamber toward the second chamber. In response to the pressure differential, the vane rotates in the first direction, thereby driving the output shaft in the first direction (e.g., clockwise), until the vane blocks off the high pressure port and the low pressure port to block the flow of the working fluid between the flow control mechanism and the first and second chambers.

The control method further may include moving the flow control mechanism in a second direction opposite to the first direction (e.g., counterclockwise) between a first position and a third position different from the second position. When the flow 20 control mechanism is moved to the third position, the high pressure port is positioned to be in fluid communication with the second chamber to permit the flow of the working fluid into the second chamber, and the low pressure port is positioned to be in fluid communication with the first chamber to permit the flow of the working fluid from the first chamber, thereby creating a pressure differential from the second chamber toward the first chamber. In response to the pressure differential, the vane rotates in the second direction (e.g. counterclockwise), thereby driving the output shaft in the second direction, until the vane blocks off the high pressure port and the low pressure port to block the flow of the working fluid between the flow control mechanism and the first and second chambers.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the 5 same way or in a similar way in one or more other embodiments and/or in combination with or instead of the features of the other embodiments.

DETAILED DESCRIPTION

Figure 1:
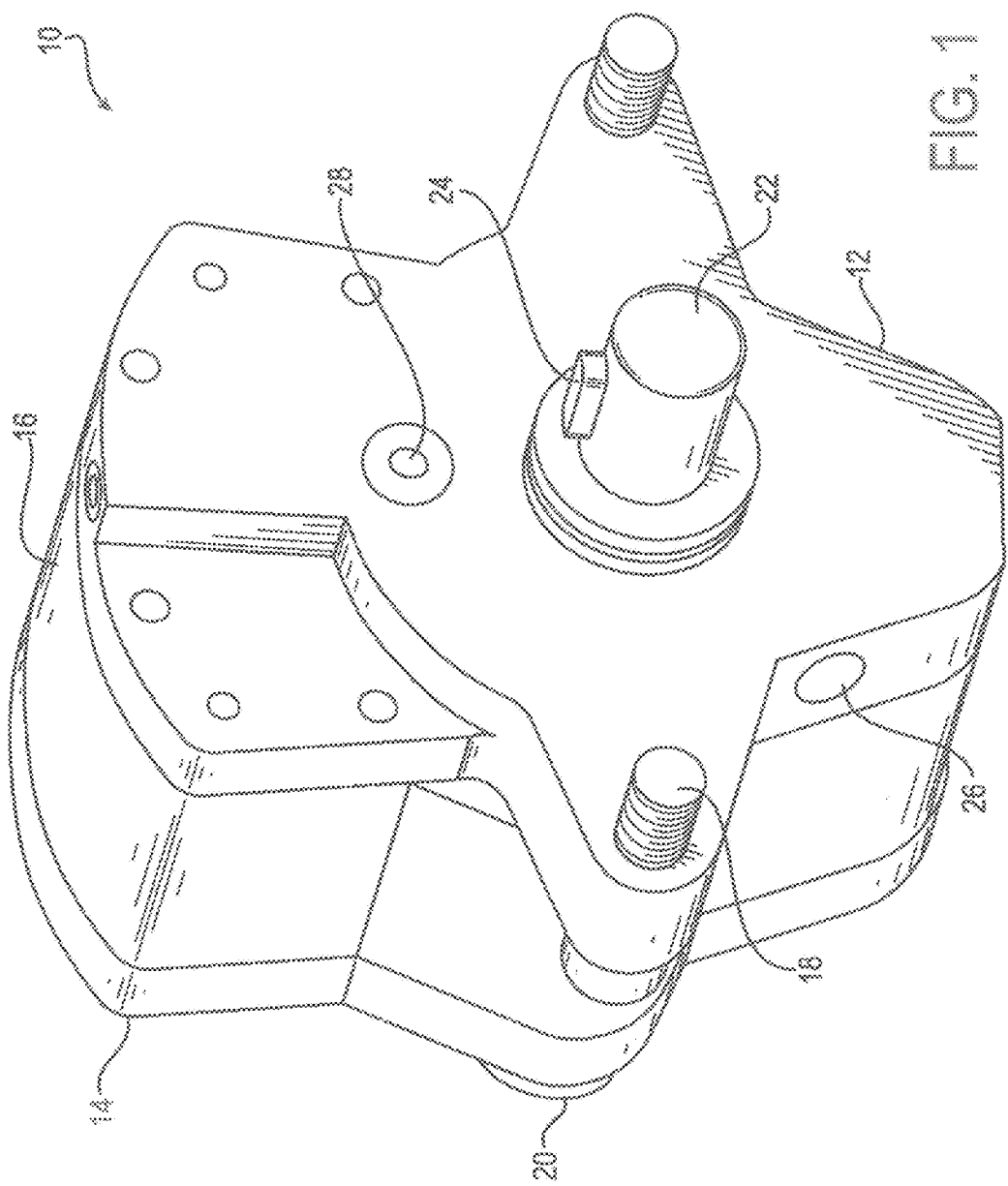
FIG. 1 is a drawing depicting a perspective view of an exemplary rotary actuator in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting a perspective view of an exemplary rotary actuator 10 in accordance with embodiments of the present invention. The rotary actuator 10 includes a first cover plate 12 on an output shaft side of the rotary actuator, and a second cover plate 14 on a motor side of the rotary actuator on an opposite side of a central housing 16 relative to the first cover plate. The two cover plates are fixed to the central housing 16 using a plurality of fastening elements 18. As seen in FIG. 1, the fastening elements may include two primary bolt elements and multiple secondary screw or bolt elements, although any suitable fastening elements may be employed. The second cover plate 14 supports a motor 20 that is fixed to the second cover plate, and that is partially viewable in FIG. 1, the operation of which is described in more detail below.

An output shaft 22 extends through the central housing 16 and through the first cover plate 12 on such output shaft side of the rotary actuator 10. The output shaft 22 may include a driving element 24 for driving an external device that is external to the rotary actuator, such as for example a swash plate associated with a hydraulic pump. Although such use is described as an example, it will be appreciated that the rotary actuator 10 may be employed to drive any suitable external device. In addition, in the example of FIG. 1 the driving element 24 is configured as a key driving element. Other configurations of driving elements may be employed, such as for example a spline configuration.

The first cover plate 12 further includes porting to communicate a flow of hydraulic fluid to and from the internal components of the rotary actuator. In various embodiments, the porting and related fluid pathways are described with respect to the flow of hydraulic fluid. It will be appreciated that references to hydraulic fluid is an example, but more broadly any suitable working fluid may be employed. The porting may include a cover plate high pressure port 26 and a cover plate low pressure port 28. The relationship of the porting to the operation of the internal components of the rotary actuator is described in more detail below.

Figure 2:
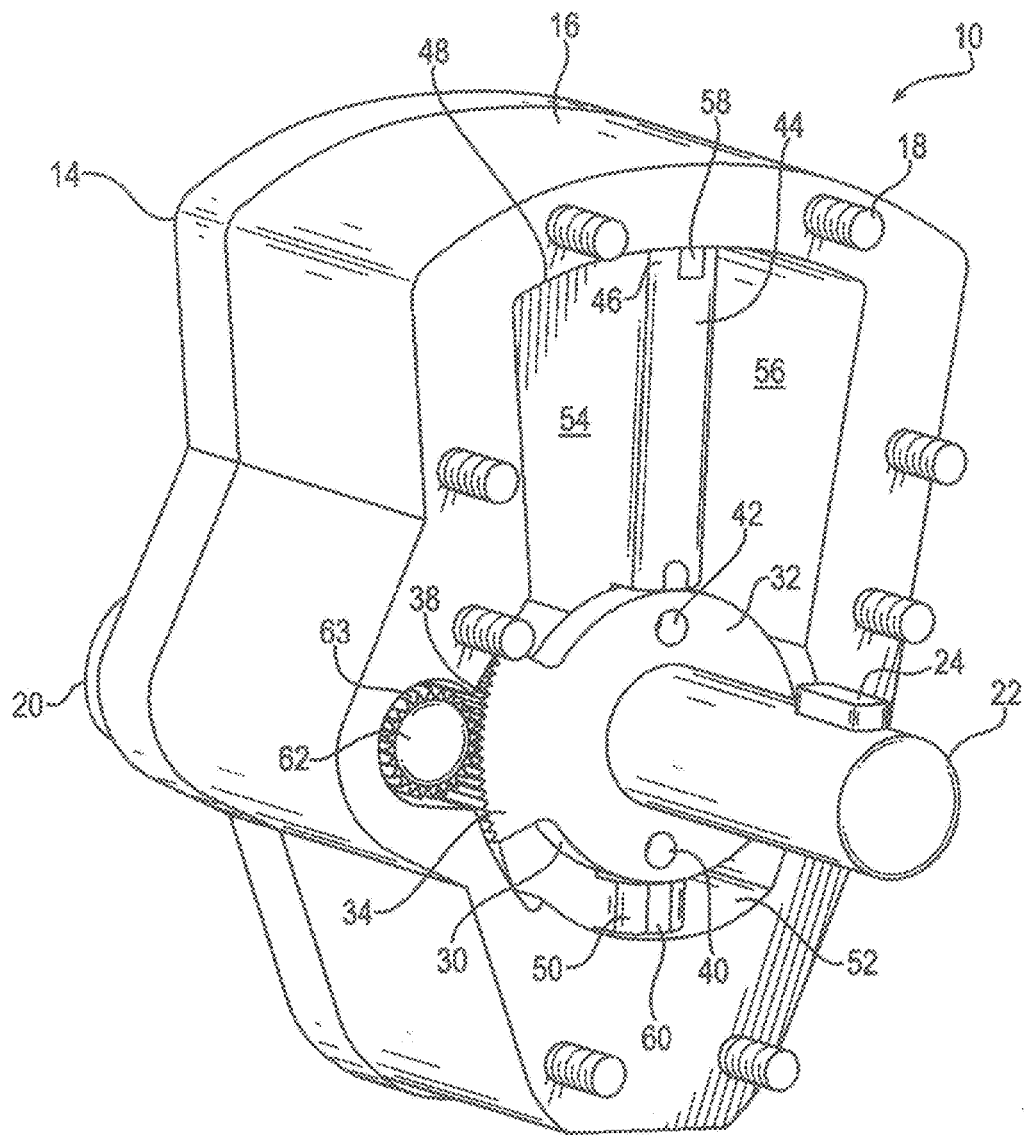
FIG. 2 is a drawing depicting the rotary actuator of FIG. 1, with an output shaft side cover plate removed.

FIG. 2 is a drawing depicting the rotary actuator 10 of FIG. 1, with the first output shaft side cover plate 12 removed to depict internal components of the rotary actuator. The rotary actuator may include a flow control mechanism that is moveable within the central housing and configured to port high pressure to one side of an actuator vane and low pressure to an opposite side of the vane, thereby generating a pressure differential across chambers defined by the actuator central housing. In exemplary embodiments, the rotary actuator 10 includes a valve plate 30 as the flow control mechanism, and that is moveable within the central housing 16. In exemplary embodiments, the valve plate 30 has a ring main body 32 and a drive extension 34 that extends from the ring main body. The ring main body 32 extends around the output shaft 22 in a manner that permits free rotation of the valve plate about the output shaft. The drive extension 34 has an outer edge configured as a spline 38 including a plurality of gear teeth. The valve plate 30 further includes porting for hydraulic fluid that drives the rotary actuator. The porting in particular includes a first port 40 and a second port 42. In exemplary embodiments, the first port 40 is a valve plate high pressure port that is in fluid communication with the cover plate high pressure port 26 through the first cover plate 12. In addition, the second port 42 is a valve plate low pressure port that is in fluid communication with the cover plate low pressure port 28 through the first cover plate 12.

A vane 44 extends within the interior of the central housing 16 adjacent to the valve plate 30. The vane 44 specifically extends through the output shaft 22 and perpendicularly with a central axis of rotation that is common to both the output shaft 22 and the ring main body 32 of the valve plate 30. The valve plate 30 is thus rotatable within the central housing 16 relative to the vane 44. In addition, the vane 44 is fixed or otherwise mechanically coupled to the output shaft 22 such that rotation of the vane 44 drives a commensurate rotation of the output shaft 22. The vane 44 has a first end 46 that slides against a first internal surface 48 of the central housing as the vane rotates. In addition, the vane 44 has a second end 50 opposite to the first end 46 that slides against a second internal surface 52 of the central housing as the vane rotates.

In the specific depiction of FIG. 2, the vane 44 is centrally positioned, extending through the output shaft 22 essentially along a vertical (longitudinal) line of symmetry that divides the rotary actuator into equal halves. The vane thus divides the interior of the central housing into a first chamber 54 and a second chamber 56. With the vane in a central position as in FIG. 2, the volumes of the first and second chambers essentially are equal. As the vane rotates clockwise or counterclockwise from the central position, volumes of the first and second chambers will change relative to each other. For example, as the vane rotates clockwise, the volume of the first chamber 54 increases while the volume of the second chamber 56 decreases, and as the vane rotates counterclockwise, the volume of the first chamber 54 decreases while the volume of the second chamber 56 increases. First and second sealing elements 58 and 60 may be provided respectively at the first and second ends 46 and 50 of the vane 44, which isolate the first chamber from the second chamber as the vane rotates so that no hydraulic fluid passes directly between the two chambers.

The rotary actuator further includes a drive mechanism that is controlled to drive the movement of the valve plate. In exemplary embodiments, the drive mechanism includes a drive spline 62. The drive spline 62 includes a plurality of gear teeth 63 that interact with the gear teeth of the spline 38 of the valve plate 30 to drive the movement of the valve plate. In this manner, rotation of the drive spline 62 in turn will drive and adjust the rotational position of the valve plate 30 via the interaction of the splines 62 and 38. The rotation of the drive spline 62 is driven by control of the motor 20, which drives the drive spline 62. In particular, an operator may send control signals to the motor, which determines the rotation of the drive spline 62, and in turn the rotational position of the valve plate 30.

The rotary actuator operates generally as follows to drive the output shaft. The valve plate is moveable within the central housing with the valve plate high pressure port and low pressure being able to communicate a working fluid (e.g., hydraulic fluid) into and from the first and second chambers. In particular, the valve plate is moveable to position the high pressure port and low pressure port relative to the first chamber and the second chamber for communication of the working fluid, thereby generating a pressure differential across the chambers. The vane rotates within the central housing in response to the pressure differential, and rotation of the vane drives the output shaft.

Figure 3:
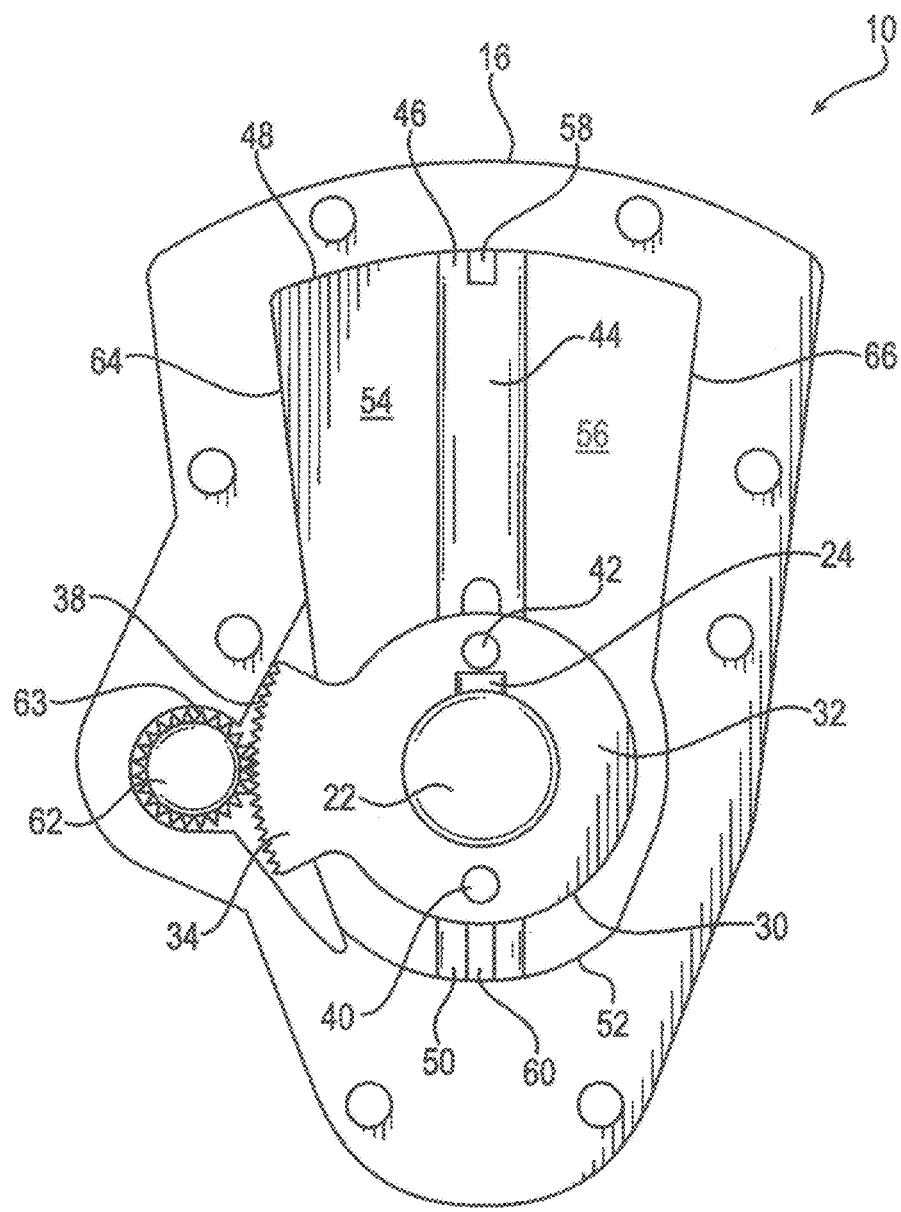
FIG. 3 is a drawing depicting a cross-sectional view of the rotary actuator of FIGS. 1 and 2, with a valve plate component positioned in a first position.
Figure 4:
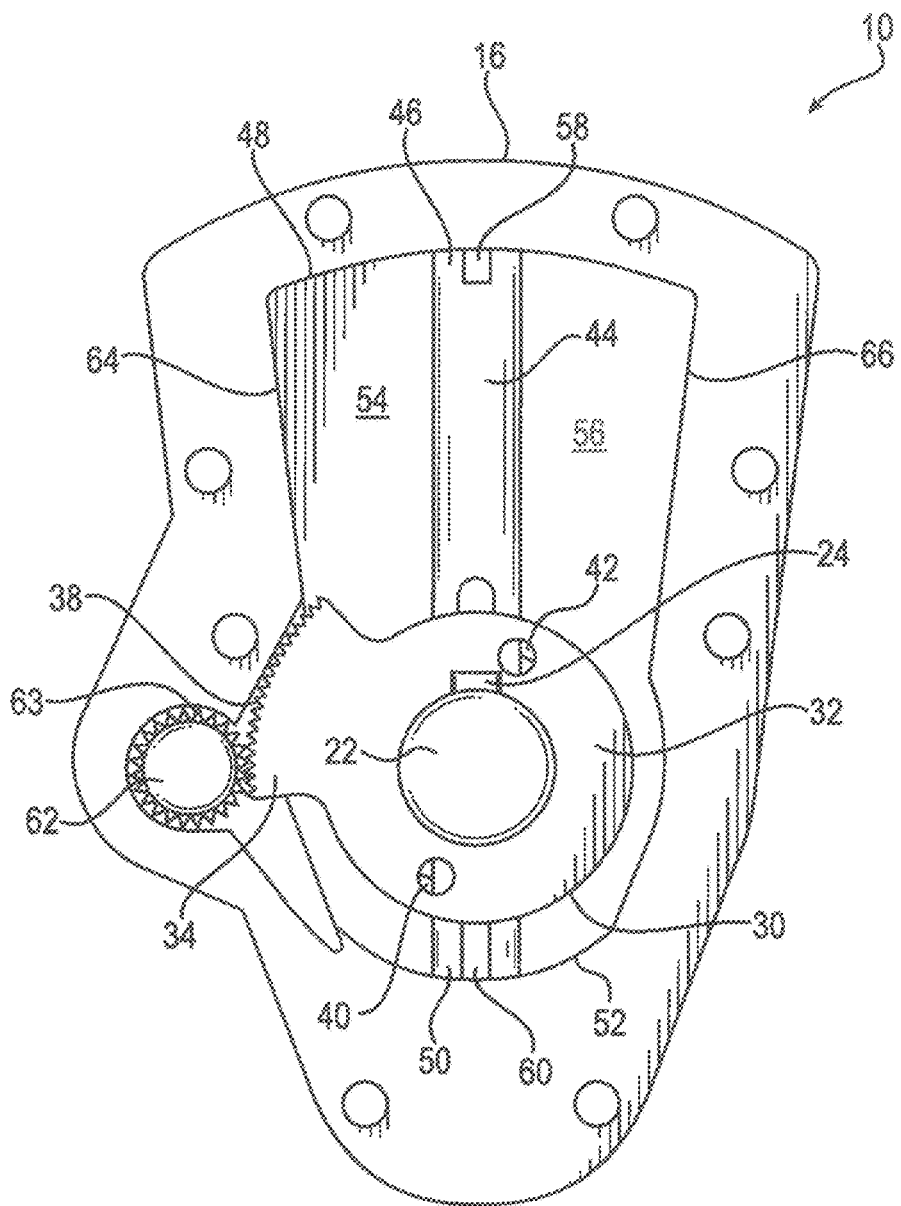
FIG. 4 is a drawing depicting the cross-sectional view of the rotary actuator comparable to FIG. 3, with the valve plate component positioned in a second position.
Figure 5:
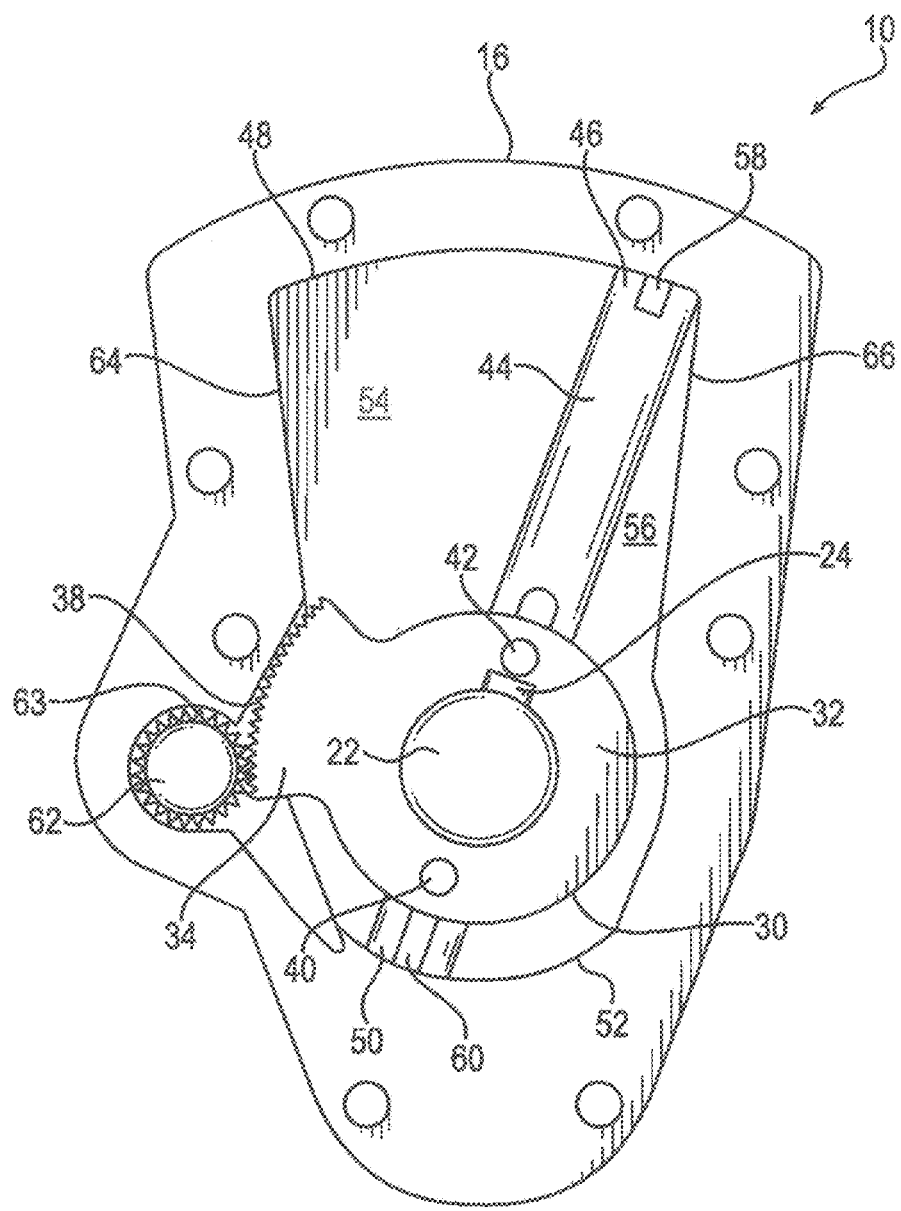
FIG. 5 is a drawing depicting the cross-sectional view of the rotary actuator comparable to FIGS. 3 and 4, with a vane component positioned in accordance with the second position of the valve plate.

FIGS. 3-5 illustrate in more detail the operation of the rotary actuator 10. FIG. 3 is a drawing depicting a cross-sectional view of the rotary actuator 10 of FIGS. 1 and 2, with the valve plate 30 positioned in a first position. FIG. 4 is a drawing depicting the cross-sectional view of the rotary actuator 10 comparable to FIG. 3, with the valve plate 30 positioned in a second position different from the first position. FIG. 5 is a drawing depicting the cross-sectional view of the rotary actuator 10 comparable to FIGS. 3 and 4, with the vane 44 positioned in accordance with the second position of the valve plate 30.

Referring first to FIG. 3, the rotational position of drive spline 62 has been controlled via the motor 20 to set the rotational position of the valve plate 30 to an exemplary first position. The first position example of FIG. 3 is the same as the position depicted in FIG. 2. In such position as described above, the vane 44 is centrally positioned relative to the central housing 16, thus dividing the interior of the central housing into equal volume first chamber 54 and second chamber 56. In this central position, the output shaft 22 with key 24 commensurately is aligned centrally as the vane 44. In this first position, the vane 44 blocks off the high pressure and low pressure hydraulic fluid ports 40 and 42 to block the flow of working fluid between the valve plate and the first and second chambers. In this first position, therefore, there is no hydraulic fluid flow into and from the chambers 54 and 56, and as a consequence there is no pressure differential as between or across the chambers. With equalized pressure, the tendency of the vane is to remain in this first position. Although the first position in this example corresponds to a central position of the vane 44, this starting point for the position of the valve plate and vane is illustrative only, and any position of equalized pressure may be characterized as a first position.

Referring now to FIG. 4, the motor has been controlled to rotate the drive spline 62 to set the rotational position of the valve plate 30 to an exemplary second position different from the first position. In this example, the valve plate is moved in a first direction between the first and second positions. In this example, therefore, the first direction is a clockwise direction and the second position corresponds to a clockwise rotation of the valve plate relative to the first position, which can be achieved by a counterclockwise rotation of the drive spline 62. In this second position, the hydraulic fluid ports 40 and 42 are no longer blocked off by the vane 44. The first port 40 is now in fluid communication with the first chamber 54 to permit the flow of hydraulic fluid into the first chamber, and the second port 42 is now in fluid communication with the second chamber 56 to permit the flow of the working fluid from the second chamber. As referenced above, in exemplary embodiments the first port 40 is a high pressure port and the second port 42 is a low pressure port. As a consequence, hydraulic fluid will flow on the high pressure side through the first port 40 into the first chamber 54, and on the low pressure side out from the second chamber 56 through the second port 42. The first chamber 54, therefore, becomes pressurized relative to the second chamber 56 so as to create a pressure differential as between or across the first chamber 54 toward the second chamber 56.

Referring now to FIG. 5, the pressure differential referenced above from first chamber 54 toward second chamber 56 has caused the vane to rotate in the first direction (e.g., clockwise) in response to the pressure differential from the first or central position to a vane position commensurate with the second position of the valve plate 30, thereby driving the output shaft in the first direction (clockwise). In this second position, therefore, the output shaft with 22 with key 24 commensurately has rotated clockwise with the rotation of the vane 44, which in turn acts to drive any external device (e.g., a pump swash plate). Upon the rotation of the vane 44, in this second position the hydraulic fluid ports 40 and 42 again become blocked off by the rotation of the vane 44. With the ports blocked off by the vane 44, there now is no hydraulic fluid flow into or from the chambers 54 and 56, and as a consequence rotation of the vane 44 has eliminated the pressure differential as between or across the first and second chambers. With equalized pressure again, the tendency of the vane is to remain in this clockwise rotated second position.

The operation of the rotary actuator 10 of FIGS. 3-5 is an example, and the motor may be controlled to set the rotational position of the valve plate to any desired position. In an alternative example operation, the valve plate is moveable in a second direction opposite to the first direction (e.g., counterclockwise) between a first position and a third position different from the first or second positions. The motor may be controlled to rotate the drive spline 62 clockwise to set the rotational position of the valve plate 30 to an exemplary third position that is counterclockwise relative to the first or central position of FIG. 3.

In the example of a counterclockwise rotation of the valve plate, when the valve plate is moved to the third position and the hydraulic fluid ports 40 and 42 are no longer blocked off by the vane 44, the first, high pressure port 40 is now in fluid communication with the second chamber 56 to permit the flow of the working fluid into the second chamber, and the second, low pressure port 42 is now in fluid communication with the first chamber 54 to permit the flow of working fluid from the first chamber. As a consequence, hydraulic fluid will flow on the high pressure side through the first port 40 into the second chamber 56, and on the low pressure side out from the first chamber 54 through the second port 42. The second chamber 56, therefore, becomes pressurized relative to the first chamber 54 so as to create a pressure differential as between or across the second chamber 56 toward the first chamber 54. In response to such pressure differential, the vane 44 rotates in the second direction (e.g., counterclockwise), thereby driving the output shaft with 22 with key 24 in the second direction to act to drive the external device (e.g., a pump swash plate) oppositely as compared to FIG. 5. Similarly to the above, the vane 44 will rotate counterclockwise until the hydraulic fluid ports 40 and 42 again become blocked off by the vane 44. With the ports blocked off by the vane 44, there now is no hydraulic fluid flow into the chambers 54 and 56, and as a consequence rotation of the vane 44 has eliminated the pressure differential as between or across the first and second chambers. With equalized pressure again, the tendency of the vane is to remain in this counterclockwise rotated third position.

It will be appreciated again that the starting or "first" position is somewhat of an arbitrary designation. Another example of the counterclockwise operation is to consider the reverse control to go from the position of FIG. 6 back to that of FIG. 4. In this example, FIG. 6 may be characterized as the "first" position. The valve plate can then be rotated counterclockwise to the position of FIG. 4, which is an example "third" position of counterclockwise rotation relative to the designated first position. Initially, the movement of the valve plate unblocks the valve plate ports 40 and 42, thereby rendering the second chamber 56 the high pressure side and the first chamber 54 the low pressure side similarly as described above. In response to this pressure differential, the vane 44 will rotate counterclockwise from the position shown in FIG. 6 to the central position shown in FIG. 4, thereby driving the output shaft in the counterclockwise direction.

The rotational range of the vane 44 depicted in the figures is approximately 60°. The rotational range of the vane 44 is limited by opposite side surfaces 64 and 66 of the central housing 16, as well as the arc length of the drive extension 34 of the valve plate 30. It will be appreciated that the central housing 16 and valve plate 30 may be configured to permit any desirable rotational range of the vane 44. Rotational ranges of 90°, 120°, and others also have proven suitable for many typical applications employing rotary actuators.

With the configuration of the rotary actuator 10, precise control of the vane is achieved to properly position the output shaft with the drive element (key), which in turn provides precise control of the external device, such as for example a hydraulic pump swash plate. The vane rotational position is maintained where the vane closes off the high pressure and low pressure ports of the valve plate, thereby equalizing the pressure differential in the first versus the second chambers of the actuator housing on opposite sides of the vane. In this manner, a precise positioning of the vane is achieved and maintained by a built-in mechanical feedback of the vane position relative to the positions of the high and low pressure ports. For example, if there is an initial overshoot in the vane rotation, the high pressure and low pressure ports become in communication with the other of the chambers, thereby reversing the pressure differential rotating the vane back to the position of blocked ports and equalized pressure. The rotary actuator, therefore, has a compact and simplified configuration that controls vane position with the built-in mechanical feedback, obviating the need for a complex control system as is typical of conventional configurations.

Figure 6:
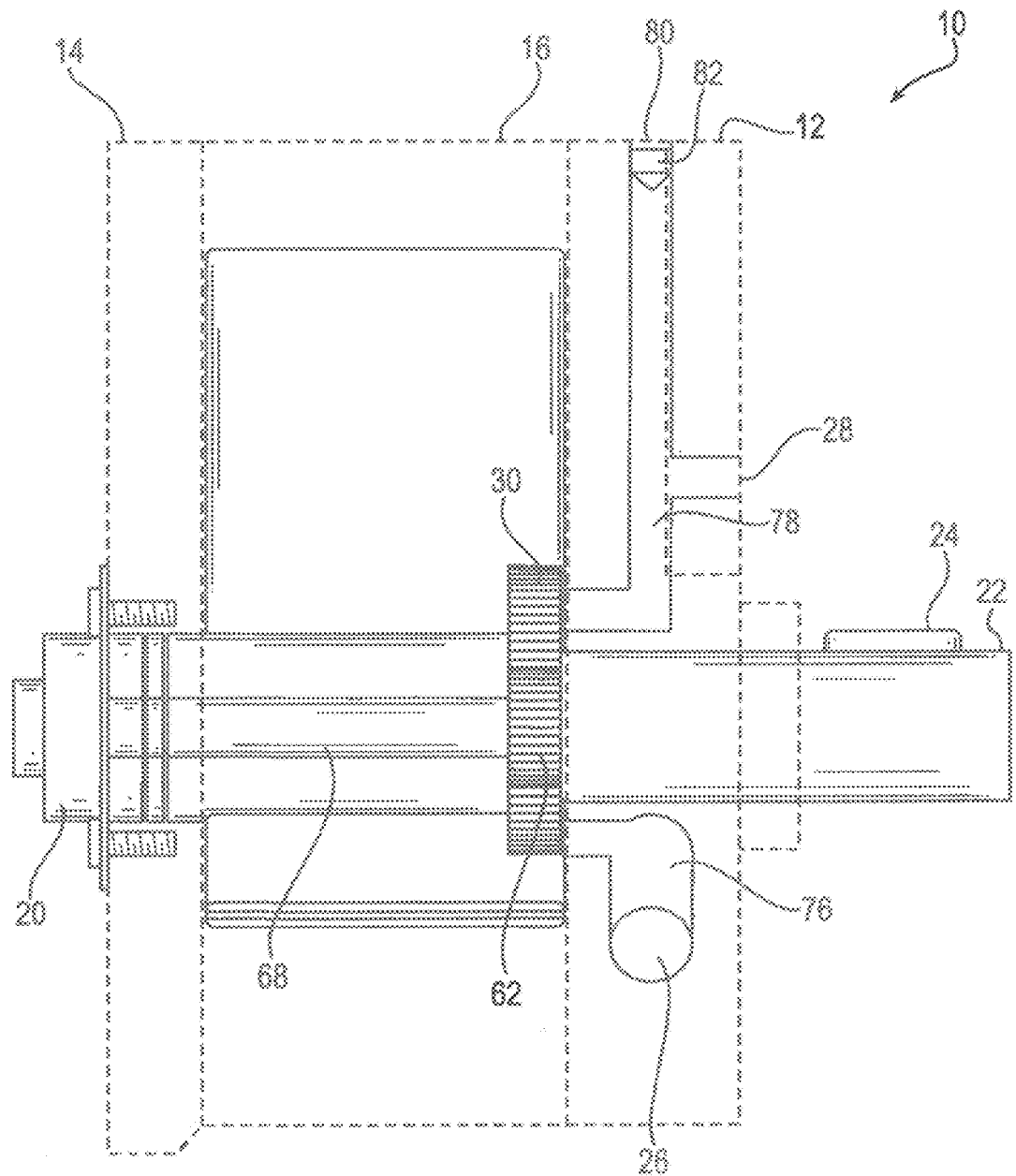
FIG. 6 is a drawing depicting a side perspective view of an exemplary rotary actuator in accordance with embodiments of the present invention, with the outer cover and housing components ghost lined.
Figure 7:
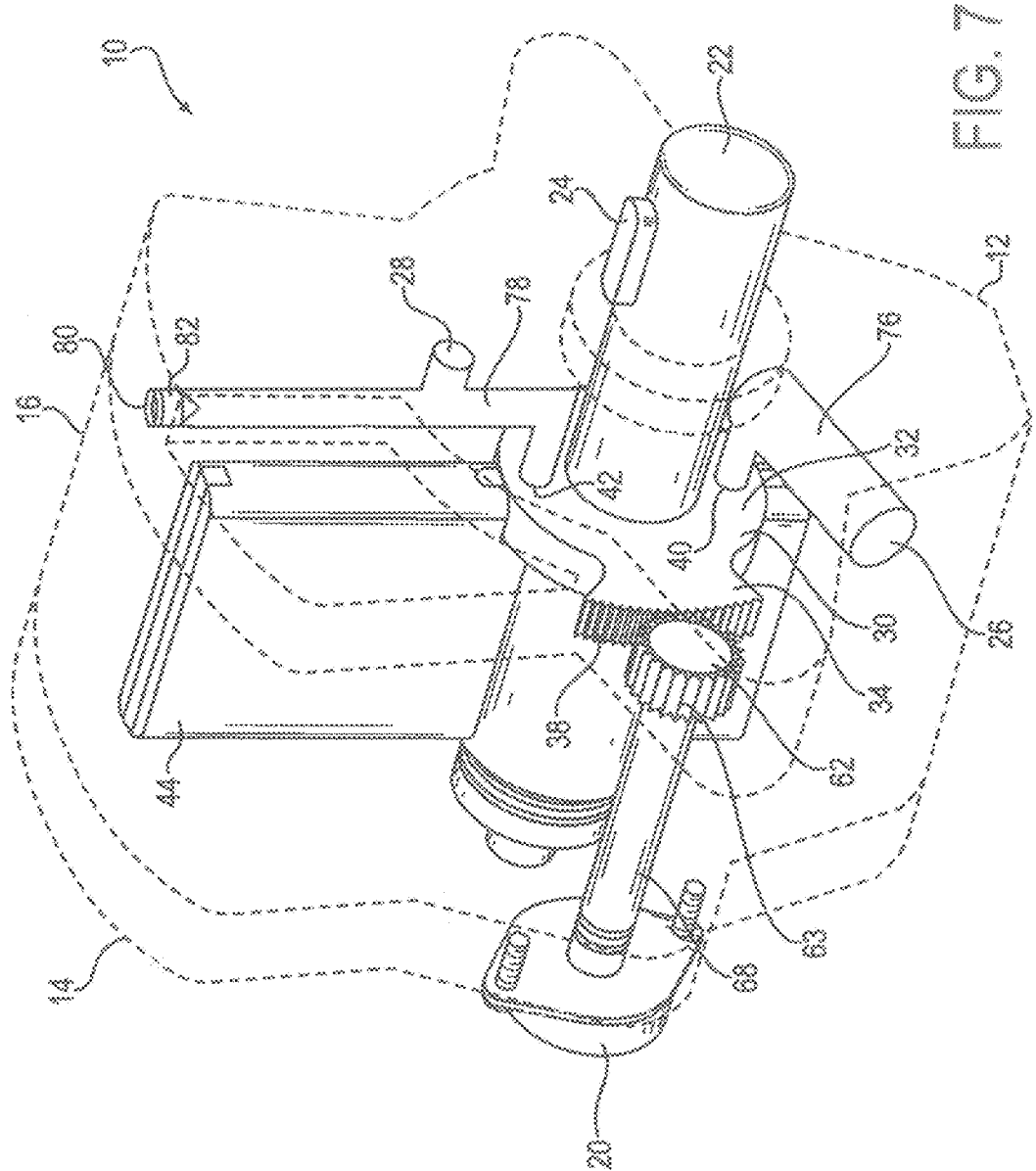
FIG. 7 is a drawing depicting an output shaft side leaning perspective view of the rotary actuator of FIG. 6.
Figure 8:
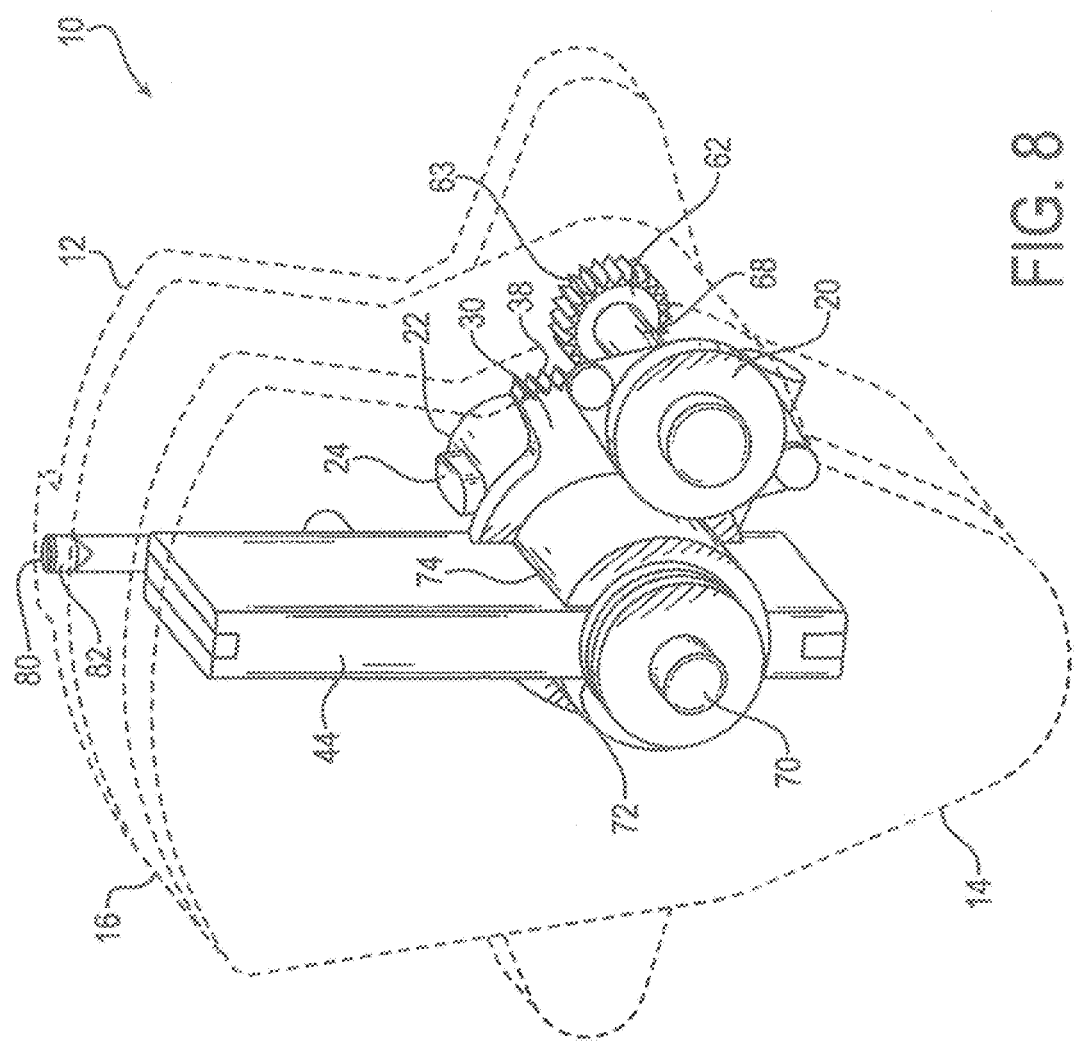
FIG. 8 is a drawing depicting a motor side leaning perspective view of the rotary actuator of FIGS. 6 and 7.

FIGS. 6-8 are drawings that provide additional views showing the configuration of the internal components of the rotary actuator 10. Accordingly, like reference numerals are used in FIGS. 6-8 to denote like structures, and comparably is in FIGS. 1-5. FIG. 6 is a drawing depicting a side perspective view of the exemplary rotary actuator 10 in accordance with embodiments of the present invention, with the outer cover plates and central housing components ghost lined. FIG. 7 is a drawing depicting an output shaft side leaning perspective view of the rotary actuator 10 of FIG. 6. FIG. 8 is a drawing depicting a motor side leaning perspective view of the rotary actuator 10 of FIGS. 6 and 7.

As referenced above, the motor 20 may be mounted on and fixed to the second cover plate 14. The motor is part of the drive mechanism that is controlled to drive the movement of the valve plate. The motor may be a simple, low cost stepper electric motor that receives control signals initiated by the user to drive the spline 62 in the manner described above. Any suitable motor, however, may be employed. The motor 20 may drive the spline 62 via a linkage shaft 68 that mechanically couples the motor to the drive spline 62. The output shaft 22 may at a shaft end 70 extend externally from the second cover plate 14 (see particularly FIG. 8). A sealing element 72 may provide a seal where the output shaft exits the second cover plate 14. FIGS. 7 and 8 in particular also provide an enhanced view of the manner by which the vane 44 is configured to extend through the output shaft 22. For example, the vane 44 may extend through a central bore 74 that is cut through the output shaft 22.

FIGS. 6 and 7 also provide enhanced views of the hydraulic porting and flow paths, particularly through the first cover plate 12. A first fluid path 76 communicates fluid from the cover plate high pressure port 26 in the first cover plate 12 to the first or high pressure port 40 in the valve plate 30. In addition, a second fluid path 78 communicates fluid from the valve plate low pressure port 42 to cover plate low pressure port 28. The second fluid path 78 further may be in fluid communication with a relief port 80, which may be used to drain fluid from the rotary actuator, for example, for maintenance or replacement. In ordinary operation, the relief port 80 is maintained closed and sealed with a plug 82.

Figure 9:
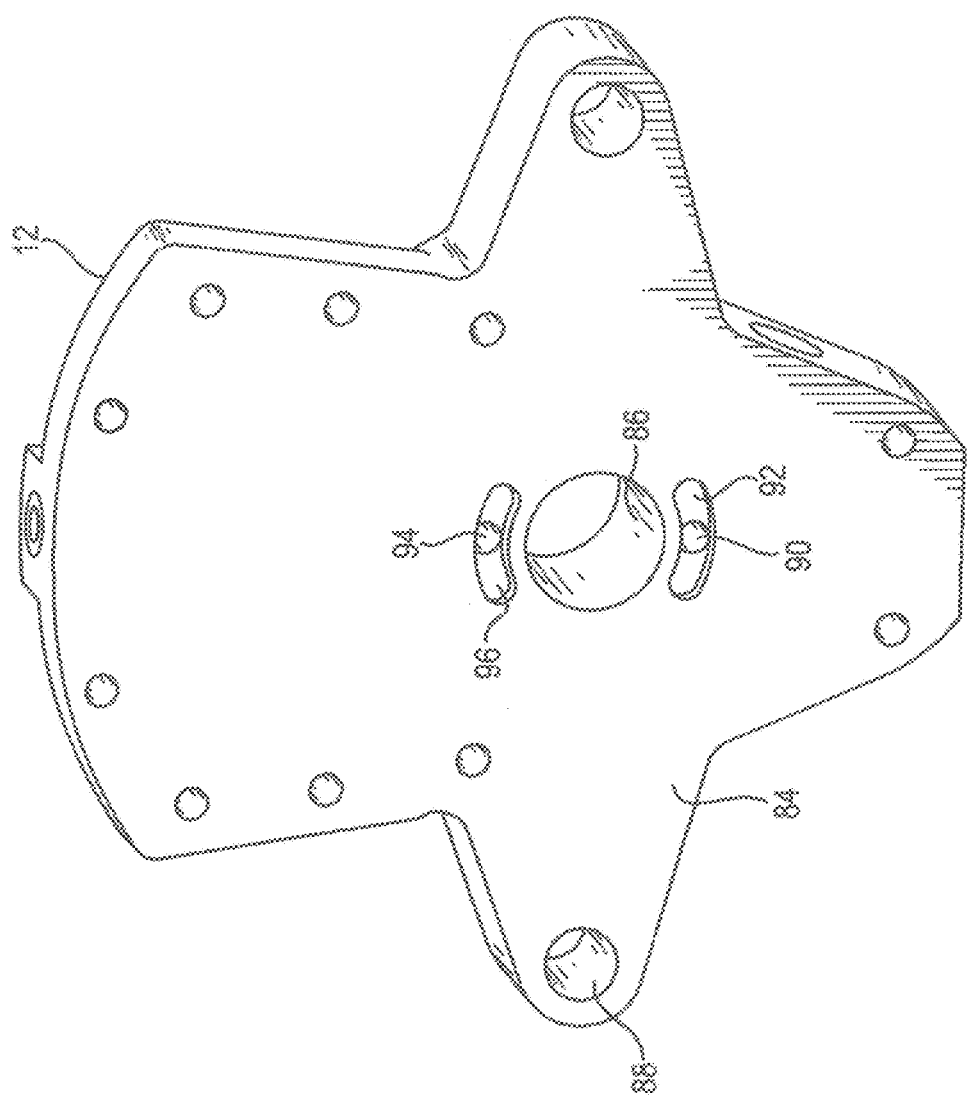
FIG. 9 is a drawing depicting an internal side view of an exemplary output shaft side cover plate for the rotary actuator in accordance with embodiments of the present invention.

FIG. 9 is a drawing depicting an internal side view of an internal side 84 of the exemplary first output shaft side cover plate 12 for the rotary actuator in accordance with embodiments of the present invention. In other words, the view of FIG. 9 is to the internal side 84 of the cover plate 12 that goes against the central housing 16 when the rotary actuator is assembled. The first cover plate 12 includes a bore 86 through which the output shaft 22 extends, and a plurality of fastening holes 88 that receive the fastening elements 18 as depicted in the other figures.

FIG. 9's internal side view of the first cover plate 12 further depicts additional details as to the porting and fluid pathways for the hydraulic fluid. On the internal side 84, the first cover plate 12 includes an inlet 90 that opens into a first kidney port 92, and an outlet inlet 94 that opens into a second kidney port 96. Through the internal fluid pathways within the cover plate 12 (see again FIGS. 6 and 7), the inlet 90 receives hydraulic fluid from the high pressure port 26 in the cover plate 12, and the outlet 94 transmits hydraulic fluid to the low pressure port 28 in the cover plate 12. The inlet 90 and the first kidney port 92 further form a fluid pathway to communicate hydraulic fluid to the high pressure fluid port 40 of the valve plate 30. Similarly, the outlet 94 and the second kidney port 96 further form a fluid pathway to communicate hydraulic fluid from the low pressure fluid port 42 of the valve plate 30. By virtue of the elongated configuration of the kidney ports 92 and 96, a fluid pathway is maintained respectively between the valve plate ports 40 and 42 of the valve plate 30, and the inlet 90 and outlet 94 of the cover plate 12, over the entire rotational range of the valve plate 30.

Figure 10:
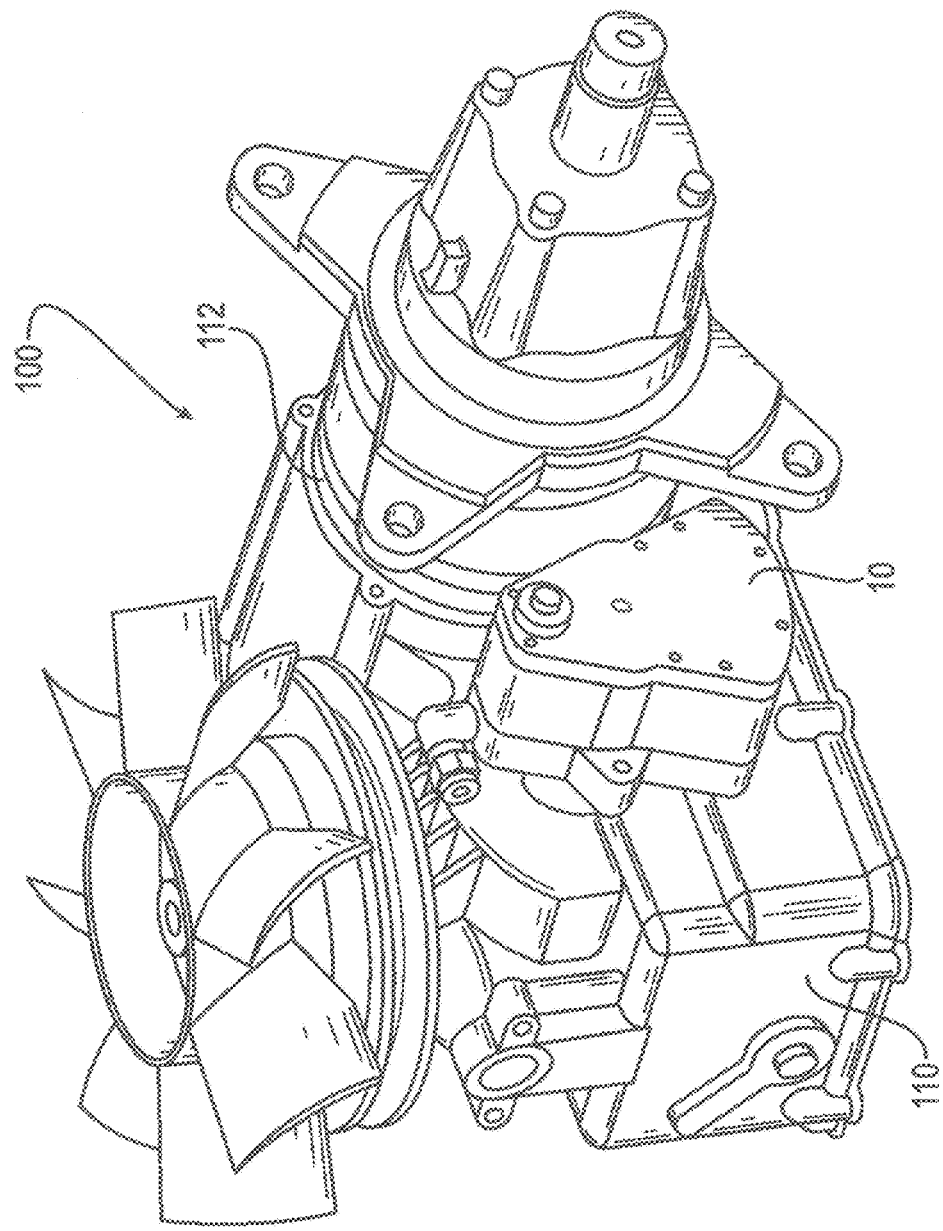
FIG. 10 is a drawing depicting an isometric view of an exemplary hydrostatic transmission in accordance with embodiments of the present invention, which incorporates the exemplary rotary actuator.

The rotary actuator may be incorporated as part of an actuator assembly for controlling a hydraulic pump. In exemplary embodiments, an actuator assembly includes a hydraulic pump, the rotary actuator in accordance with any of the above embodiments, wherein the rotary actuator is controlled to drive the hydraulic pump to control the flow of hydraulic fluid from the hydraulic pump. Such an actuator assembly may be incorporated in a variety of applications. As an exemplary usage, FIG. 10 is a drawing depicting an isometric view of an exemplary hydrostatic transmission 100 in accordance with embodiments of the present invention. As referenced above, a hydrostatic transmission such as hydrostatic transmission 100 may be employed to drive the wheels in light vehicle, such as for example mowers and tractors, including zero turn radius vehicles. In exemplary embodiments, the hydrostatic transmission 100 includes a hydraulic pump 110 and a hydraulic motor 112, wherein the hydraulic pump pumps hydraulic fluid to the hydraulic motor. The hydrostatic transmission further includes the rotary actuator 10 according to any of the above embodiments, wherein the rotary actuator is controlled to drive the hydraulic pump to control the flow of hydraulic fluid from the hydraulic pump to the hydraulic motor. In particular, the output shaft of the rotary actuator is mechanically coupled to the hydraulic pump to drive the hydraulic pump.

Figure 11:
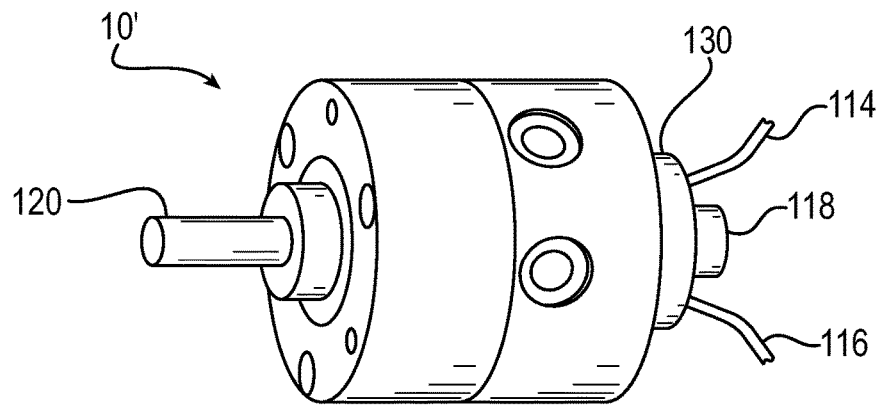
FIG. 11 is a drawing depicting a perspective view of an exemplary rotary actuator in accordance with embodiments of the present invention, which incorporates the exemplary rotary valve.
Figure 12:
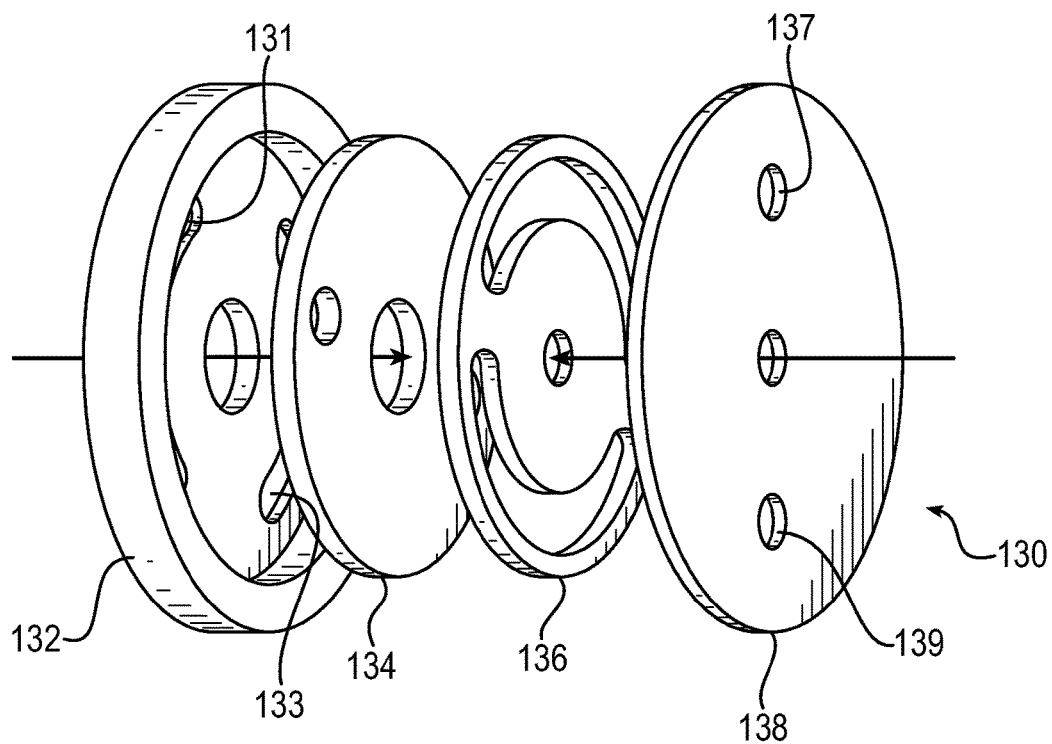
FIG. 12 is an exploded perspective view of the exemplary rotary valve shown in FIG. 11.
Figure 13:
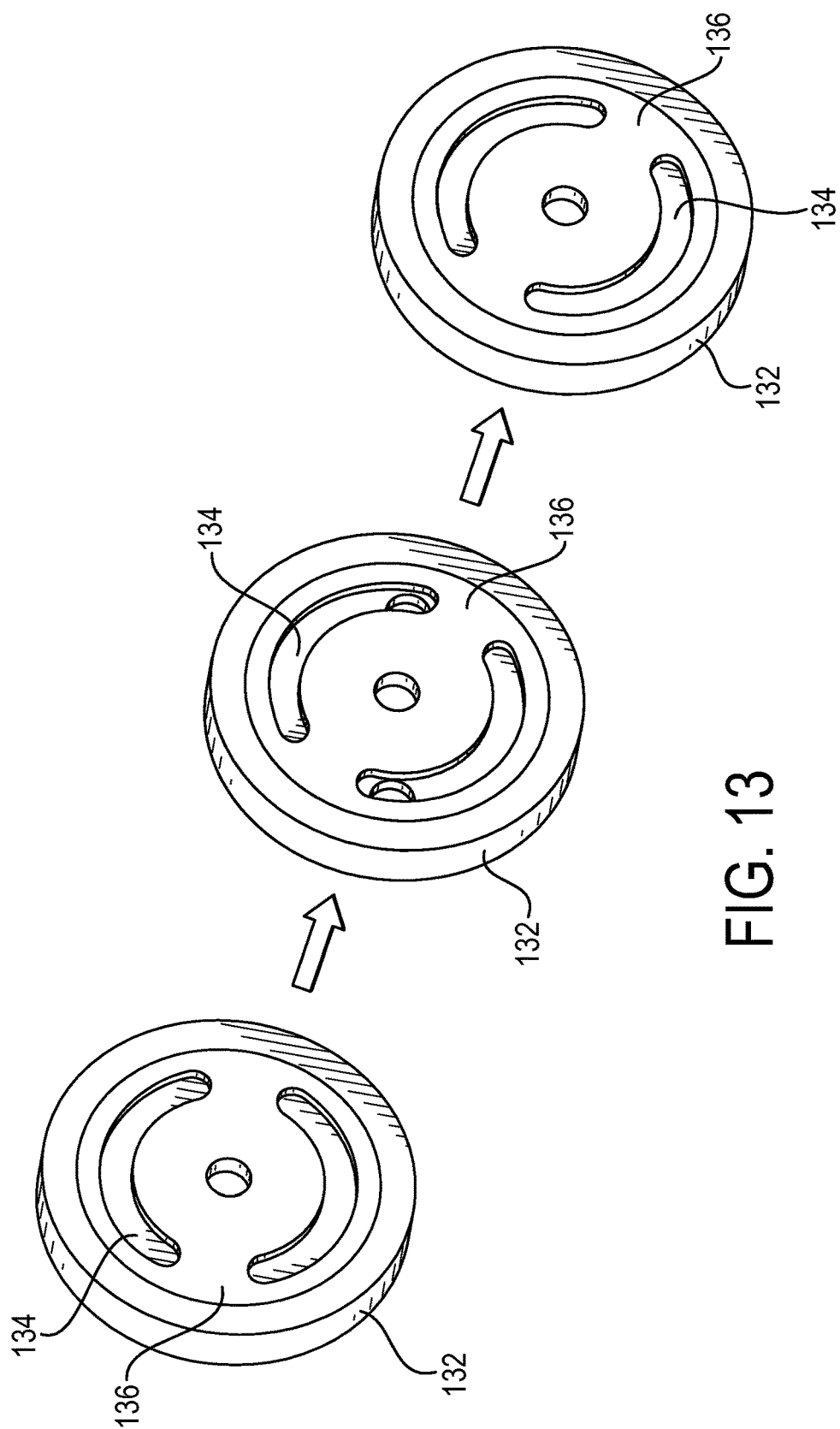
FIG. 13 is a series of partial perspective views depicting the operation of the rotary valve of FIG. 11.

Referring now to FIG. 11, an exemplary embodiment of a rotary actuator 10' is shown including a rotary valve 130, a fluid connection to drain 114, a fluid connection to a charge pump 116, and a stepper motor with position sensor 118. The output shaft 120 may drive rotation of a swash plate associated with the hydraulic pump to drive the hydraulic pump. Further details of the rotary valve 130 are shown in FIGS. 12 and 13. The rotary valve includes a back housing 132, an actuator plate 134, a control plate 136, and a front housing 138. The actuator plate 134 is mechanically connected to the device that will be actuated, i.e. a rotary actuator, swash plate, or other rotational device. This connection is only meant to communicate position, not to drive or be driven by a significant amount of torque. This means the rotary position of the actuator plate 134 will directly correspond to the actuator rotary position. The control plate 136 is mechanically connected to a controlling device such as an electric motor 118. The electric motor 118 rotates the control plate 136 to the desired actuator rotary position. The back housing 132 has two ports 131, 133. In the sketch shown, the left port 131 would connect fluid such that positive flow from this port would rotate the actuator clockwise. The right port 133 would connect fluid such that positive flow from this port would rotate the actuator counterclockwise. The back housing 132 does not rotate. The front housing 138 is mechanically fixed to the back housing 132 to enclose the actuator plate 134 and control plate 136. The top port 137 of the front housing 138 is connected to low pressure or drain. The bottom port 139 is connected to high pressure that will be used for the actuation.

The function of the rotary valve 130 is shown in FIG. 13. Starting from a stationary position, the electric motor 118 will rotate the control plate 136 to the desired actuator position. This opens a flow path from the high pressure source, through the actuator plate 134 and to the clockwise chamber of the actuator. At the same time the counterclockwise chamber of the actuator is connected to the drain. As the actuator moves, the actuator plate 134 rotates due to their mechanical connection. As the actuator plate 134 approaches the position of the control plate 136, the flow path from high pressure to the actuator chamber is closed.

The ports on the actuator plate 134 and control plate 136 can be shaped in order to vary the response time and stability of the system. This may include cross porting or maintaining both actuator chambers at high pressure until movement is desired.

An aspect of the invention, therefore, is a rotary actuator. In exemplary embodiments, the rotary actuator includes a central housing; an output shaft that extends through the central housing; a vane that is mechanically coupled to the output shaft and divides the central housing into a first chamber and a second chamber; and a flow control mechanism that is moveable within the central housing and configured to port high pressure to one side of the vane and low pressure to an opposite side of the vane, thereby generating a pressure differential across the chambers. The vane rotates within the central housing in response to the pressure differential, and rotation of the vane drives the output shaft. The rotary actuator may include one or more of the following features individually or in combination.

In an exemplary embodiment of the rotary actuator, the flow control mechanism is moveable in a first direction between a first position and a second position different from the first position; in the first position the vane blocks off the high pressure port and the low pressure port to block the flow of the working fluid between the flow control mechanism and the first and second chambers; when the flow control mechanism is moved to the second position, the high pressure port is positioned to be in fluid communication with the first chamber to permit the flow of the working fluid into the first chamber, and the low pressure port is positioned to be in fluid communication with the second chamber to permit the flow of the working fluid from the second chamber, thereby creating a pressure differential from the first chamber toward the second chamber; and in response to the pressure differential, the vane rotates in the first direction, thereby driving the output shaft in the first direction, until the vane blocks off the high pressure port and the low pressure port to block the flow of the working fluid between the flow control mechanism and the first and second chambers.

In an exemplary embodiment of the rotary actuator, the flow control mechanism is moveable in a second direction opposite to the first direction between a first position and a third position different from the second position; in the first position the vane blocks off the high pressure port and the low pressure port to block the flow of the working fluid between the flow control mechanism and the first and second chambers; when the flow control mechanism is moved to the third position, the high pressure port is positioned to be in fluid communication with the second chamber to permit the flow of the working fluid into the second chamber, and the low pressure port is positioned to be in fluid communication with the first chamber to permit the flow of the working fluid from the first chamber, thereby creating a pressure differential from the second chamber toward the first chamber; and in response to the pressure differential, the vane rotates in the second direction, thereby driving the output shaft in the second direction, until the vane blocks off the high pressure port and the low pressure port to block the flow of the working fluid between the flow control mechanism and the first and second chambers.

In an exemplary embodiment of the rotary actuator, the flow control mechanism comprises a valve plate that is moveable within the central housing and including a high pressure port and a low pressure port for communicating the working fluid into and from the first and second chambers; and wherein the valve plate is moveable to position the high pressure port and low pressure port relative to the first chamber and the second chamber for communication of the working fluid, thereby generating the pressure differential across the chambers.

In an exemplary embodiment of the rotary actuator, the valve plate has a ring main body that extends around the output shaft in a manner that permits free rotation of the valve plate relative to the output shaft.

In an exemplary embodiment of the rotary actuator, the valve plate has a drive extension that extends from the ring main body, the drive extension being configured to interact with a drive mechanism that drives the movement of the valve plate.

In an exemplary embodiment of the rotary actuator, the drive extension has an outer edge configured as a spline with a plurality of gear teeth.

In an exemplary embodiment of the rotary actuator, the vane extends through the output shaft and perpendicularly to a central axis of rotation that is common to both the output shaft and the flow control mechanism.

In an exemplary embodiment of the rotary actuator, the vane has a first end that slides against a first internal surface of the central housing as the vane rotates, and a second end opposite to the first end that slides against a second internal surface of the central housing as the vane rotates.

In an exemplary embodiment of the rotary actuator, the vane has first and second sealing elements provided respectively at the first and second ends, which isolate the first chamber from the second chamber as the vane rotates so that no working fluid passes directly between the two chambers.

In an exemplary embodiment of the rotary actuator, the rotary actuator further includes a drive mechanism that is controlled to drive the movement of the flow control mechanism.

In an exemplary embodiment of the rotary actuator, the drive mechanism includes a motor.

In an exemplary embodiment of the rotary actuator, the motor is an electric 10 motor, and the motor is configured to receive control signals to drive the movement of the valve plate.

In an exemplary embodiment of the rotary actuator, the drive mechanism includes a drive spline having a plurality of gear teeth that interact with the gear teeth of the spline of the valve plate to drive the movement of the valve plate.

In an exemplary embodiment of the rotary actuator, the drive mechanism includes a linkage shaft that mechanically couples the motor to the drive spline.

In an exemplary embodiment of the rotary actuator, the rotary actuator further includes a first cover plate fixed to the central housing, and a second cover plate fixed to the central housing on an opposite side relative to the first cover plate.

In an exemplary embodiment of the rotary actuator, the first cover plate is an output shaft side cover plate. The first cover plate includes a cover plate high pressure port, and a first fluid path that communicates working fluid from the cover plate high pressure port to the valve plate high pressure port; and a cover plate low pressure port, and a second fluid path that communicates working fluid from the valve plate low pressure port to the cover plate low pressure port.

In an exemplary embodiment of the rotary actuator, the first cover plate includes an inlet that opens into a first kidney port, and an outlet inlet that opens into a second kidney port. The inlet receives working fluid from the cover plate high pressure port, and the inlet and the first kidney port further form a fluid pathway to 30 communicate working fluid to the valve plate high pressure port; the outlet transmits hydraulic fluid to the cover plate low pressure port, and the outlet and the second kidney port further form a fluid pathway to communicate working fluid from the valve plate low pressure port; and the kidney ports have an elongated configuration to maintain a fluid pathway respectively between the valve plate ports and the inlet and outlet of the first cover plate over an entire movement range of the valve plate.

In an exemplary embodiment of the rotary actuator, the second cover plate is a motor side cover plate, the rotary actuator further comprising a motor that is mounted to the second cover plate and controlled to drive the movement of the valve plate.

In an exemplary embodiment of the rotary actuator, the output shaft has a 10 driving element for driving an external device that is external to the rotary actuator.

In an exemplary embodiment of the rotary actuator, the driving element is one of a key or a spline.

Another aspect of the invention is an actuator assembly. In exemplary embodiments, the actuator assembly includes a hydraulic pump and the rotary actuator of any of the above embodiments. The rotary actuator is controlled to control the hydraulic pump to control the flow of hydraulic fluid from the hydraulic pump.

Another aspect of the invention is a hydrostatic transmission. In exemplary embodiments, the hydrostatic transmission includes a hydraulic pump, a hydraulic motor, wherein the hydraulic pump pumps hydraulic fluid to the motor, and the rotary actuator of any of the above embodiments. The rotary actuator is controlled to control the hydraulic pump to control the flow of hydraulic fluid from the hydraulic pump to the hydraulic motor.

In an exemplary embodiment of the hydrostatic transmission, the output shaft of the rotary actuator is mechanically coupled to the hydraulic pump to control the hydraulic pump.

In an exemplary embodiment of the hydrostatic transmission, the output shaft drives rotation of a swash plate associated with the hydraulic pump to drive the hydraulic pump.

Another aspect of the invention is a method of controlling a rotary actuator to drive an output shaft. In exemplary embodiments, the control method comprising the steps of: providing a rotary actuator comprising: a central housing; an output shaft that extends through the central housing; a vane that is mechanically coupled to the output shaft and divides the central housing into a first chamber and a second chamber; and a flow control mechanism that is moveable within the central housing and configured to port high pressure to one side of the vane and low pressure to an opposite side of the vane; and moving the flow control mechanism to port the high pressure and low pressure relative to the first chamber and the second chamber for communication of the working fluid, thereby generating a pressure differential across the chambers; wherein the vane rotates within the central housing in response to the pressure differential, and rotation of the vane drives the output shaft.

In an exemplary embodiment of the control method, the control method includes moving the flow control mechanism in a first direction between a first position and a second position different from the first position; wherein: in the first position the vane blocks off the high pressure port and the low pressure port to block the flow of the working fluid between the flow control mechanism and the first and second chambers; when the flow control mechanism is moved to the second position, the high pressure port is positioned to be in fluid communication with the first chamber to permit the flow of the working fluid into the first chamber, and the low pressure port is positioned to be in fluid communication with the second chamber to permit the flow of the working fluid from the second chamber, thereby creating a pressure differential from the first chamber toward the second chamber; and in response to the pressure differential, the vane rotates in the first direction, thereby driving the output shaft in the first direction, until the vane blocks off the high pressure port and the low pressure port to block the flow of the working fluid between the flow control mechanism and the first and second chambers.

In an exemplary embodiment of the control method, the control method further includes moving the flow control mechanism in a second direction opposite to the first direction between a first position and a third position different from the second position; wherein: in the first position the vane blocks off the high pressure port and the low pressure port to block the flow of the working fluid between the flow control mechanism and the first and second chambers; when the flow control mechanism is moved to the third position, the high pressure port is positioned to be in fluid communication with the second chamber to permit the flow of the working fluid into the second chamber, and the low pressure port is positioned to be in fluid communication with the first chamber to permit the flow of the working fluid from the first chamber, thereby creating a pressure differential from the second chamber toward the first chamber; and in response to the pressure differential, the vane rotates in the second direction, thereby driving the output shaft in the second direction, until the vane blocks off the high pressure port and the low pressure port to block the flow of the working fluid between the flow control mechanism and the first and second chambers.

In an exemplary embodiment of the control method, the flow control mechanism comprises a valve plate that is moveable within the central housing and including a high pressure port and a low pressure port for communicating a working fluid into and from the first and second chambers. The control method further includes moving the valve plate to position the high pressure port and low pressure port relative to the first chamber and the second chamber for communication of the working fluid, thereby generating the pressure differential across the chambers.

In an exemplary embodiment of the control method, the control method further includes providing a motor, and controlling the motor to drive the movement of the flow control mechanism.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rotary actuator comprising:
a central housing;
an output shaft that extends through the central housing;
a vane that is mechanically coupled to the output shaft and divides the central housing into a first chamber and a second chamber; and
a flow control mechanism that is moveable within the central housing and configured to port high pressure to one side of the vane and low pressure to an opposite side of the vane, thereby generating a pressure differential across the chambers;
wherein the vane rotates within the central housing in response to the pressure differential, and rotation of the vane drives the output shaft;
wherein the flow control mechanism comprises a valve plate that is moveable within the central housing and including a high pressure port and a low pressure port for communicating the working fluid into and from the first and second chambers; and
wherein the valve plate is moveable to position the high pressure port and low pressure port relative to the first chamber and the second chamber for communication of the working fluid, thereby generating the pressure differential across the chambers.

2. The rotary actuator of claim 1, wherein:
the flow control mechanism is moveable in a first direction between a first position and a second position different from the first position;
in the first position the vane blocks off the high pressure port and the low pressure port to block the flow of the working fluid between the flow control mechanism and the first and second chambers;
when the flow control mechanism is moved to the second position, the high pressure port is positioned to be in fluid communication with the first chamber to permit the flow of the working fluid into the first chamber, and the low pressure port is positioned to be in fluid communication with the second chamber to permit the flow of the working fluid from the second chamber, thereby creating a pressure differential from the first chamber toward the second chamber; and
in response to the pressure differential, the vane rotates in the first direction, thereby driving the output shaft in the first direction, until the vane blocks off the high pressure port and the low pressure port to block the flow of the working fluid between the flow control mechanism and the first and second chambers.

3. The rotary actuator of claim 2, wherein:
the flow control mechanism is moveable in a second direction opposite to the first direction between a first position and a third position different from the second position;
in the first position the vane blocks off the high pressure port and the low pressure port to block the flow of the working fluid between the flow control mechanism and the first and second chambers;
when the flow control mechanism is moved to the third position, the high pressure port is positioned to be in fluid communication with the second chamber to permit the flow of the working fluid into the second chamber, and the low pressure port is positioned to be in fluid communication with the first chamber to permit the flow of the working fluid from the first chamber, thereby creating a pressure differential from the second chamber toward the first chamber; and
in response to the pressure differential, the vane rotates in the second direction, thereby driving the output shaft in the second direction, until the vane blocks off the high pressure port and the low pressure port to block the flow of the working fluid between the flow control mechanism and the first and second chambers.

4. The rotary actuator of claim 2, further comprising:
a first cover plate fixed to the central housing; and
a second cover plate fixed to the central housing on an opposite side relative to the first cover plate.

5. The rotary actuator of claim 4, wherein the first cover plate is an output shaft side cover plate, the first cover plate comprising:
a cover plate high pressure port, and a first fluid path that communicates working fluid from the cover plate high pressure port to the valve plate high pressure port; and a cover plate low pressure port, and a second fluid path that communicates working fluid from the valve plate low pressure port to the cover plate low pressure port.

6. The rotary actuator of claim 5, wherein the first cover plate includes:
an inlet that opens into a first kidney port; and
an outlet inlet that opens into a second kidney port; wherein:
the inlet receives working fluid from the cover plate high pressure port, and the inlet and the first kidney port further form a fluid pathway to communicate working fluid to the valve plate high pressure port;
the outlet transmits hydraulic fluid to the cover plate low pressure port, and the outlet and the second kidney port further form a fluid pathway to communicate working fluid from the valve plate low pressure port; and
the kidney ports have an elongated configuration to maintain a fluid pathway respectively between the valve plate ports and the inlet and outlet of the first cover plate over an entire movement range of the valve plate.

7. The rotary actuator of claim 4, wherein the second cover plate is a motor side cover plate, the rotary actuator further comprising a motor that is mounted to the second cover plate and controlled to drive the movement of the valve plate.

8. The rotary actuator of claim 1, wherein the vane extends through the output shaft and perpendicularly to a central axis of rotation that is common to both the output shaft and the flow control mechanism.

9. The rotary actuator of claim 8, wherein the vane has a first end that slides against a first internal surface of the central housing as the vane rotates, and a second end opposite to the first end that slides against a second internal surface of the central housing as the vane rotates.

10. The rotary actuator of claim 9, wherein the vane has first and second sealing elements provided respectively at the first and second ends, which isolate the first chamber from the second chamber as the vane rotates so that no working fluid passes directly between the two chambers.

11. The rotary actuator of claim 1, further comprising a drive mechanism that is controlled to drive the movement of the flow control mechanism.

12. A hydrostatic transmission comprising:
a hydraulic pump;
a hydraulic motor, wherein the hydraulic pump pumps hydraulic fluid to the motor; and
the rotary actuator of claim 1, wherein the rotary actuator is controlled to control the hydraulic pump to control the flow of hydraulic fluid from the hydraulic pump to the hydraulic motor.

13. The hydrostatic transmission of claim 12, wherein the output shaft of the rotary actuator is mechanically coupled to the hydraulic pump to control the hydraulic pump, and the output shaft drives rotation of a swash plate associated with the hydraulic pump to control the hydraulic pump.

14. A method of controlling the rotary actuator according to claim 1 to drive the output shaft, the method comprising the steps of:
providing the rotary actuator; and
moving the flow control mechanism to port the high pressure and low pressure relative to the first chamber and the second chamber for communication of the working fluid, thereby generating the pressure differential across the chambers;
wherein the vane rotates within the central housing in response to the pressure differential, and rotation of the vane drives the output shaft.

15. The control method of claim 14 comprising:
moving the flow control mechanism in a first direction between a first position and a second position different from the first position; wherein:
in the first position the vane blocks off the high pressure port and the low pressure port to block the flow of the working fluid between the flow control mechanism and the first and second chambers;
when the flow control mechanism is moved to the second position, the high pressure port is positioned to be in fluid communication with the first chamber to permit the flow of the working fluid into the first chamber, and the low pressure port is positioned to be in fluid communication with the second chamber to permit the flow of the working fluid from the second chamber, thereby creating a pressure differential from the first chamber toward the second chamber; and
in response to the pressure differential, the vane rotates in the first direction, thereby driving the output shaft in the first direction, until the vane blocks off the high pressure port and the low pressure port to block the flow of the working fluid between the flow control mechanism and the first and second chambers.

16. The control method of claim 15, further comprising:
moving the flow control mechanism in a second direction opposite to the first direction between a first position and a third position different from the second position; wherein:
in the first position the vane blocks off the high pressure port and the low pressure port to block the flow of the working fluid between the flow control mechanism and the first and second chambers;
when the flow control mechanism is moved to the third position, the high pressure port is positioned to be in fluid communication with the second chamber to permit the flow of the working fluid into the second chamber, and the low pressure port is positioned to be in fluid communication with the first chamber to permit the flow of the working fluid from the first chamber, thereby creating a pressure differential from the second chamber toward the first chamber; and
in response to the pressure differential, the vane rotates in the second direction, thereby driving the output shaft in the second direction, until the vane blocks off the high pressure port and the low pressure port to block the flow of the working fluid between the flow control mechanism and the first and second chambers.

17. An actuator assembly comprising:
a hydraulic pump; and
a rotary actuator comprising:
a central housing;
an output shaft that extends through the central housing;
a vane that is mechanically coupled to the output shaft and divides the central housing into a first chamber and a second chamber; and
a flow control mechanism that is moveable within the central housing and configured to port high pressure to one side of the vane and low pressure to an opposite side of the vane, thereby generating a pressure differential across the chambers;
wherein the vane rotates within the central housing in response to the pressure differential, and rotation of the vane drives the output shaft; and wherein the rotary actuator is controlled to control the hydraulic pump to control the flow of hydraulic fluid from the hydraulic pump.

18. A rotary valve comprising:

a housing having an interior chamber and a high pressure port and a drain port;

a control plate rotatable within the housing and coupled to an actuator shaft; and an actuator plate rotatable within the housing and coupled to a stepper motor;

wherein rotational movement of the control plate opens a flow path from the high pressure source, through the actuator plate and to a clockwise chamber of the actuator and movement of the control plate opens a counterclockwise chamber of the actuator to the drain; and as the actuator plate approaches the position of the control plate, the flow path from high pressure to the actuator chamber is closed.

\* \* \* \* \*